US006315021B1

(12) United States Patent
Lee et al.

(10) Patent No.: US 6,315,021 B1
(45) Date of Patent: Nov. 13, 2001

(54) LABELING MACHINE

(75) Inventors: Jack Lee; Shun-Yi Lee, both of Chungho (TW)

(73) Assignee: Boma Technology Co., Ltd., Chungho (TW)

( * ) Notice: Subject to any disclaimer, the term of this patent is extended or adjusted under 35 U.S.C. 154(b) by 0 days.

(21) Appl. No.: 09/477,137

(22) Filed: Jan. 3, 2000

(30) Foreign Application Priority Data

Nov. 30, 1999 (TW) ........................................ 88220403 U

(51) Int. Cl.$^{7}$ ................................................ B32B 31/00
(52) U.S. Cl. ........................ 156/391; 156/556; 156/580
(58) Field of Search .................................. 156/391, 556, 156/579, DIG. 24, 538, 380, 580

(56) References Cited

U.S. PATENT DOCUMENTS 5,783,031 * 7/1998 Sievers .............................. 156/556
6,148,891 * 11/2000 Lee .................................... 156/391

* cited by examiner

*Primary Examiner*—Richard Crispino
*Assistant Examiner*—Sue A. Purvis
(74) *Attorney, Agent, or Firm*—Kolisch Hartwell Dickinson McCormack & Heuser

(57) ABSTRACT

A labeling machine includes a base with an upright cylinder integrally formed at the center thereof, a stopper detachably provided at a top end of the cylinder and a moving disk movable along the cylinder. When a compact disk is provided on the top end of the cylinder and retained by the stopper inserted into the top end of the cylinder, and a label is placed on the top surface of the moving disk, then the labeling machine is turned over, whereby the label is adhered to the compact disk.

7 Claims, 5 Drawing Sheets

LABELING MACHINE

BACKGROUND OF THE INVENTION

1. Field of the Invention

The present invention relates to a labeling machine used to label different types of compact disks involving 12 inch, 8 inch and card type compact disks, and more particularly to a labeling machine having multiple bulges formed on the slide guide and multiple hooks formed to correspond to the bulges, thereby facilitating the labeling procedure and ensuring the proper adhesion of a label to a compact.

2. Description of Related Art

Compact disks are normally labeled for classifying and facilitating searching by users. A conventional labeling machine comprises a hollow base having an upright fixing post integrally formed at a center thereof, a spring provided around the fixing central post with a pressing tube movably provided around the fixing post above the spring, and a pressing disk with a clamping ring engaged therewith together provided on the base. When a label with an adhesive surface facing upwards is placed on the pressing disk, a compact disk is placed around the fixing post above the pressing tube. Then a pressing block is provided around the fixing post above the compact disk. Next, the pressing block is pressed down towards the label placed on the pressing disk, whereby the label is adhered to the compact disk.

The above described conventional labeling machine has a structure that is very complex, and it is practicable for 12 inch or 8 inch compact disks only.

Therefore, it is an objective of the invention to provide an improved labeling machine to mitigate and/or obviate the aforementioned problems.

SUMMARY OF THE INVENTION

The main object of the present invention is to provide a labeling machine which has a very simple structure and is very easy to operate.

The further object of the present invention is to provide a labeling machine which is practicable for different types of compact disks involving 12 inch, 8 inch and card type compact disks.

Other objects, advantages and novel features of the invention will become more apparent from the following detailed description when taken in conjunction with the accompanying drawings.

DETAILED DESCRIPTION OF THE PREFERRED EMBODIMENT

Figure 1:
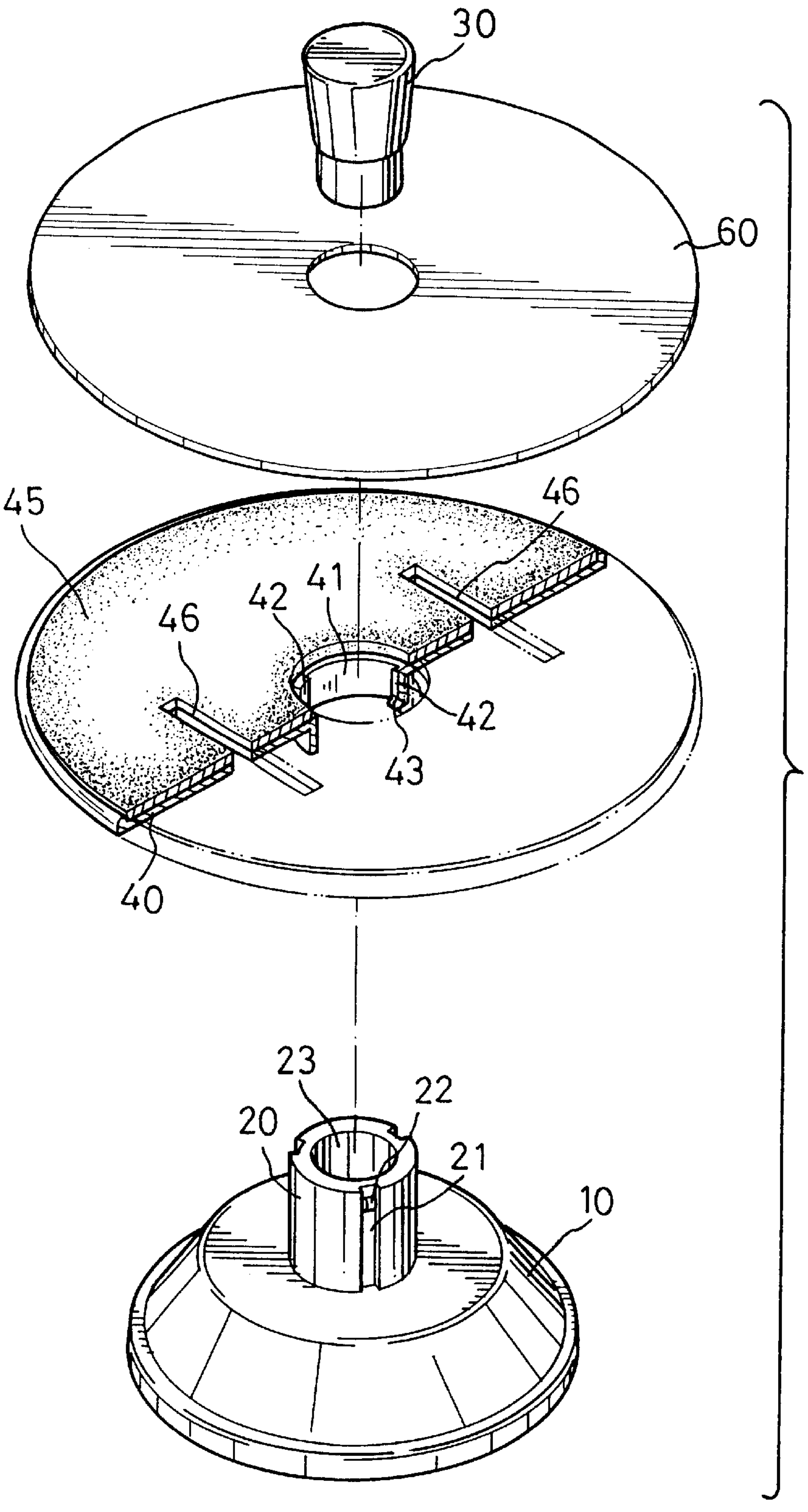
FIG. 1 is an exploded perspective view of a first embodiment of a labeling machine in accordance of the present invention.

As shown in FIG. 1, the present invention relates to a labeling machine, which comprises a base (10) with a cylinder (20) integrally formed at the center of a top face thereof, a stopper (30) detachably provided at a top end of the cylinder (20) and a moving disk (40) movable along the cylinder (20).

The cylinder (20) has a plurality of slide guides (21) axially defined therearound. Each slide guide (21) has a bulge (22) formed thereon near the top end thereof. The stopper (30) has a small end mated with an upper opening (23) of the cylinder (20) and a large end formed as a conical block.

The moving disk (40) defines a central hole (41) therein with a plurality of guide blocks (42) integrally formed therearound. Each guide block (42) correspond to one of the slide guides (21) of the cylinder (20). Each guide block (42) integrally forms a hook (43) thereon and each hook (43) correspond to one of the bulges (22) of the respective slide guide (21). A soft pad (45) is provided on a top surface of the moving disk (40).

Figure 2:
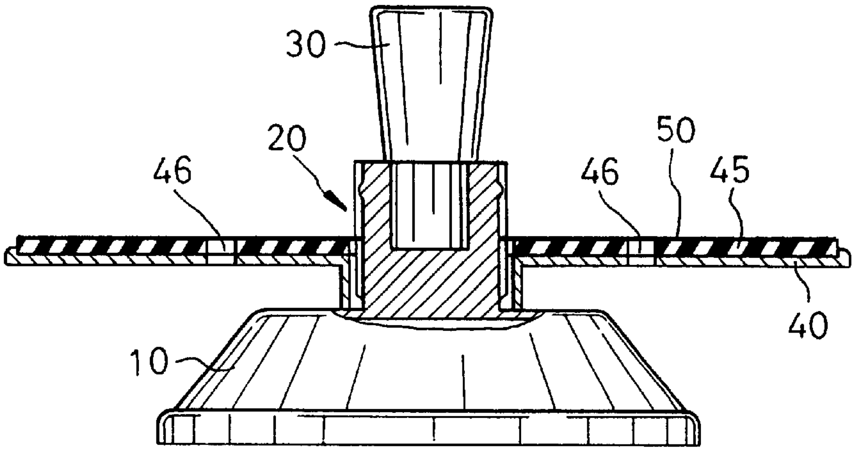
FIG. 2 is a side view with partial in cross section of the labeling machine as shown in FIG. 1.
Figure 3:
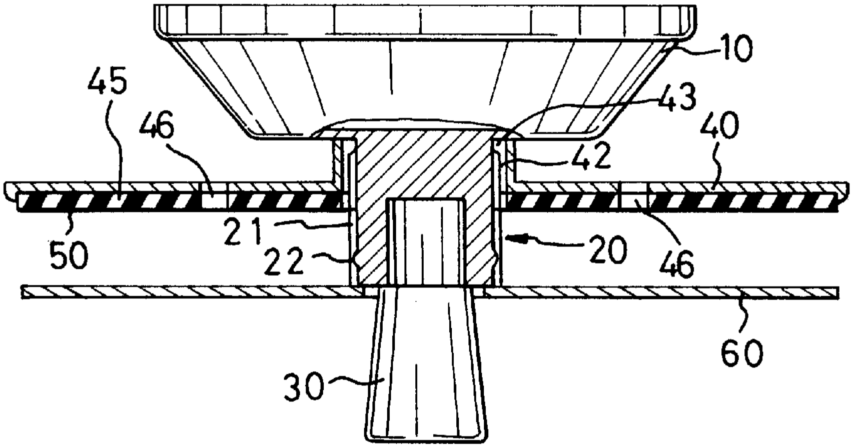
FIG. 3 is a side view with partial in cross section of the labeling machine shown in FIG. 1, wherein the labeling machine is inverted for application.
Figure 4:
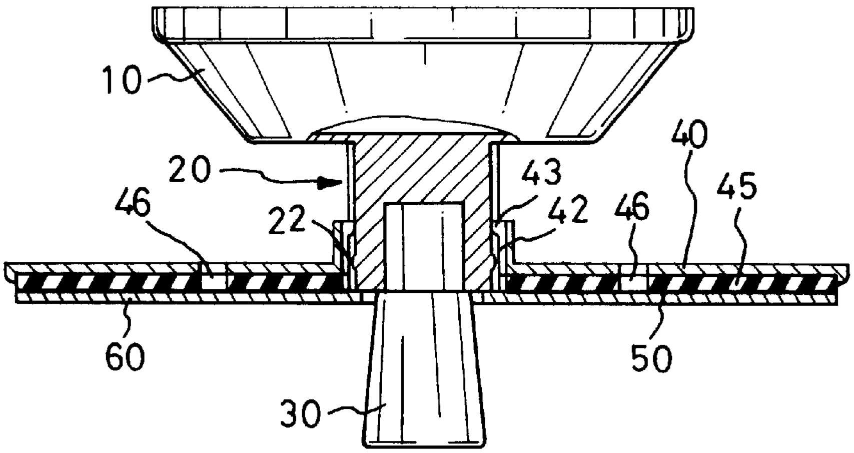
FIG. 4 is a side view in partial cross section showing the mating between the hook and the buldge.

As shown in FIGS. 2 to 4, the moving disk (40) is provided around the cylinder (20), the each of the guide blocks (42) are respectively and movably received in the corresponding one of the slide guides (21) of the cylinder (20). A label (50) having an adhesive surface facing upwards is provided on the soft pad (45) of the moving disk (40). A 12 inch compact disk (60) having a front face facing upwards is provided on the top end of the cylinder (20) and retained by the stopper (30) inserted into the opening (23) of the top end of the cylinder (20). When the labeling machine is turned over, the moving disk (40) falls along the slide guides (21), and the hooks (43) are retained by the bulges (22) of the slide guides (21), thereby the label is adhered to a back surface of the compact disk (60).

Figure 5:
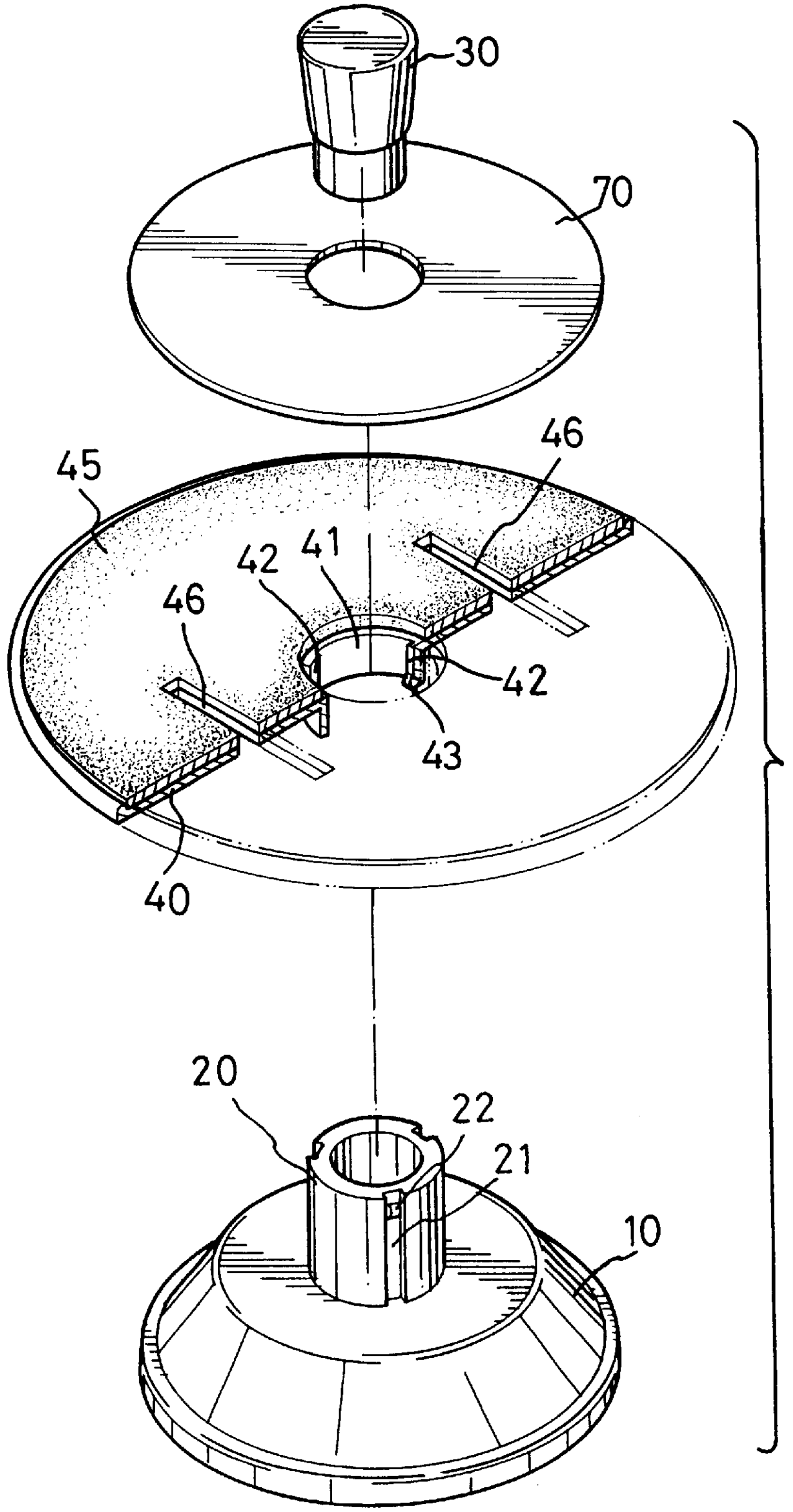
FIG. 5 is an exploded perspective view of a second embodiment of the labeling machine in accordance of the present invention.
Figure 6:
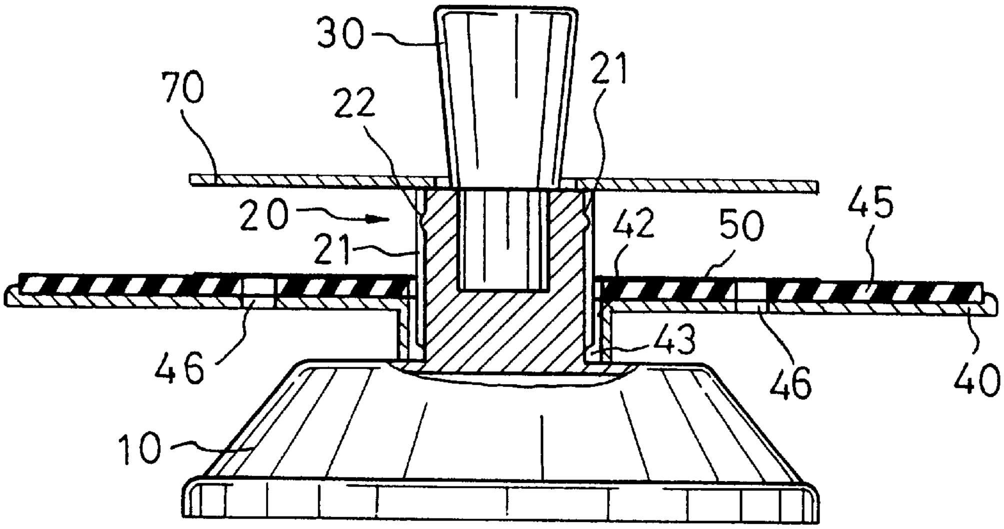
FIG. 6 is a side view in partial cross section of the second embodiment of the labeling machine in accordance of the present invention.

FIGS. 5 and 6 show the labeling machine of the present invention is also practicable for an 8 inch compact disk (70) in a same principle.

Figure 8:
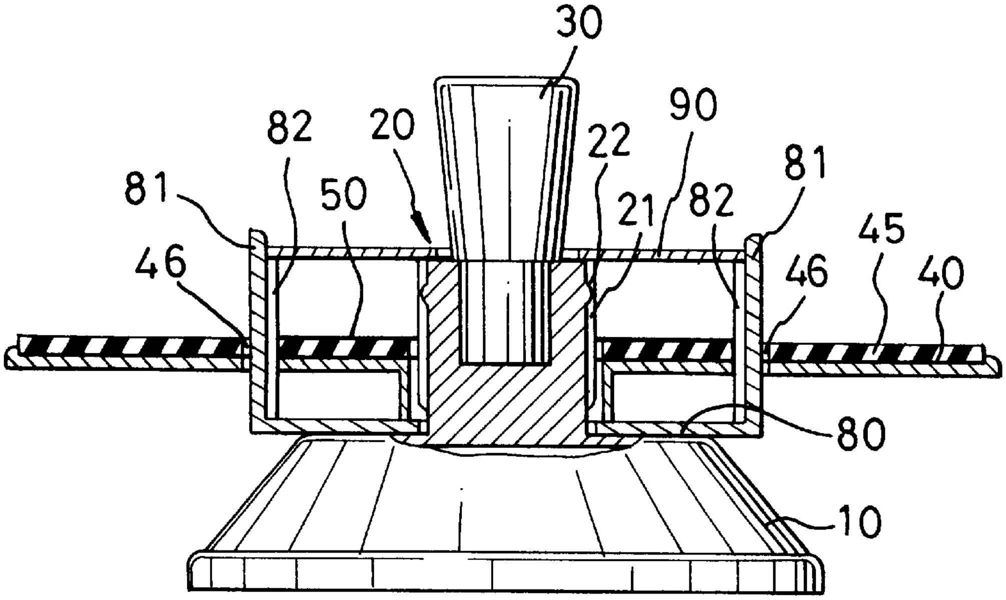
FIG. 8 is a side view in partial cross section of the third embodiment of the labeling machine in accordance of the present invention.
Figure 7:
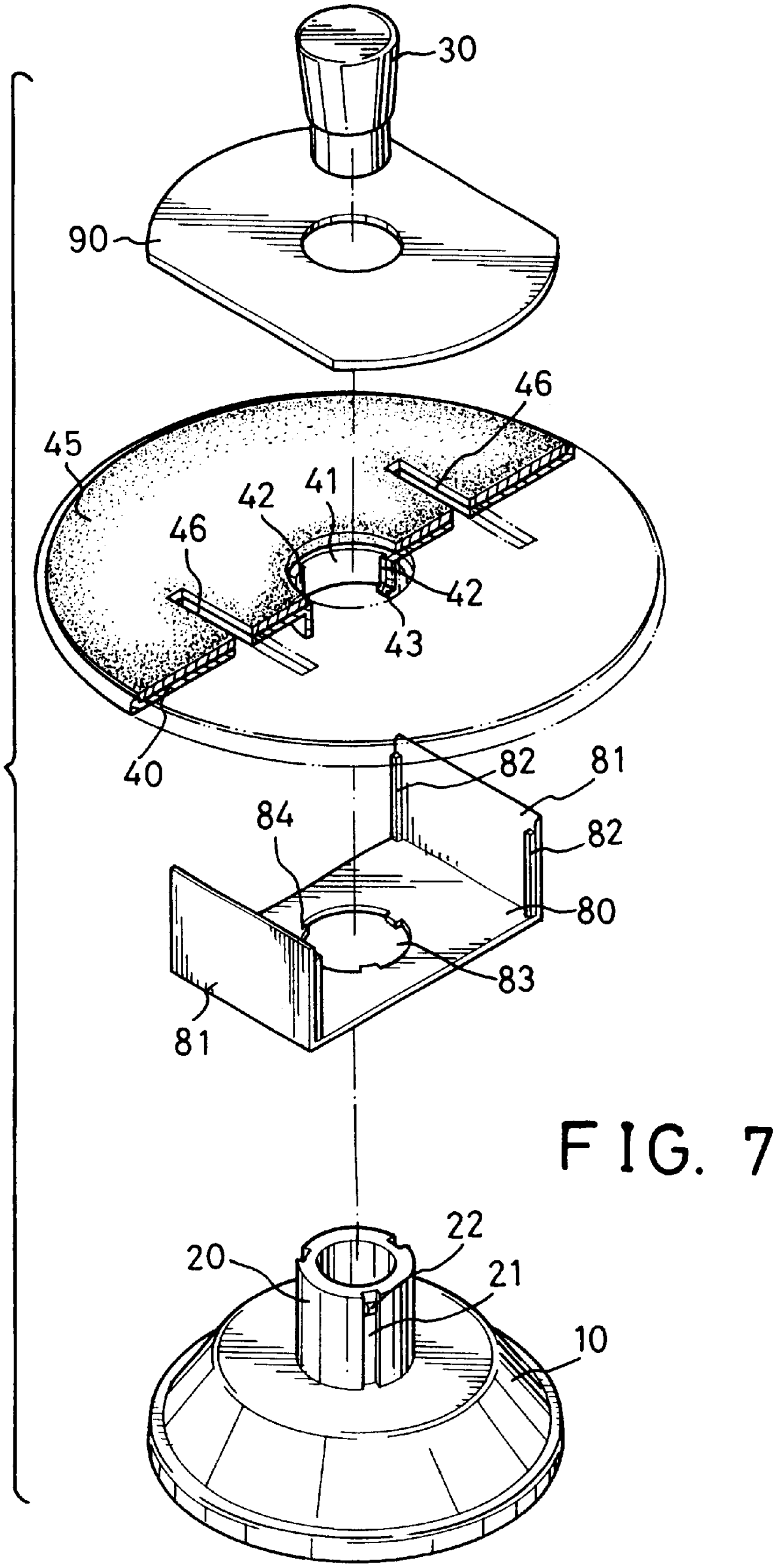
FIG. 7 is an exploded perspective view of a third embodiment of the labeling machine in accordance of the present invention.

As shown in the accompanying drawings and especially in FIGS. 7 and 8, the moving disk (40) defines a pair of parallel slots (46) therein each being at opposite sides of the central hole (41) thereof.

A limit frame (80) is formed as a U-shaped member having a central plate provided around the cylinder (20) and two opposite side blades (81) respectively inserted through the slots (46) of the moving disk (40). The side blades (81) respectively form two pairs of stubs (82) on opposite inner surfaces at opposite ends thereof. The central plate of the limit frame (80) defines a central hole (83) therein with a plurality of guide blocks (84) formed therearound. Each of the guide blocks (84) correspond to one of the slide guides (21) of the cylinder (20).

The label (50) having an adhesive surface facing upwards is placed on the moving disk (40) between the opposite side blades (81) of the limiting frame (80). A card type compact disk (90) is supported on top ends of the stubs (82) of the limiting frame (80). Then the stopper (30) has the small end thereof inserted into the top end of the cylinder (20) to retain the compact disk (90) thereby. After the label machine is turned over, the moving disk (40) falls, and the hooks (43) are retained by the bulges (22) of the cylinder (20). The label is then adhered to the compact disk (90).

The advantages of the present invention are as following:

1. The structure of the labeling machine of the present invention is simple;
2. The fabrication cost is low; and
3. The labeling machine of the present invention is practicable for different types of compact disks including 12 inch, 8 inch and card type compact disks.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A labeling machine comprising a base (10);

an upright cylinder (20) integrally formed at the center of the base (10) and defining a plurality of axial slide guides (21) therearound;

a stopper (30) detachably received in an opening (23) defined in a top end of the cylinder (20);

a moving disk (40) movably provided around the cylinder (20) and defining a central hole (41) therein with a plurality of guide blocks (42) formed therearound, wherein each one of the guide blocks (42) correspond to one of the slide guides (21) of the cylinder (20).

2. The labeling machine as claimed in claim 1, wherein each one of the slide guides (21) has a bulge (22) formed thereon near a top end thereof, and each one of the guide blocks (42) of the moving disk (40) has a hook (43) integrally formed to correspond to one of the bulges (22) of the slide guide (21).

3. The labeling machine as claimed in claim 1, wherein the moving disk (40) has a soft pad (45) provided on a top face thereof.

4. The labeling machine as claimed in claim 1, wherein the moving disk (40) defines a pair of parallel slots (46) therein at opposite sides of the central hole (41) thereof.

5. The labeling machine as claimed in claim 4 further comprising a limit frame (80) formed as a U-shaped member having a central plate provided around the cylinder (20) and two opposite side blades (81) respectively inserted through the slots (46); wherein the side blades (81) of the limit frame (80) respectively form two pairs of stubs (82) on opposite inner surfaces at opposite ends thereof, wherein the central plate of the limiting frame (80) defines a central hole (83) therein with a plurality of guide blocks (84) formed to correspond to the slide guides (21) of the cylinder (20).

6. The labeling machine as claimed in claim 3, wherein the moving disk (40) and the soft pad (45) incorporately define a pair of parallel slots (46) therein at opposite sides of the central hole (41).

7. The labeling machine as claimed in claim 6 further comprising a U-shaped limit frame (80) having a central plate provided around the cylinder (20) and two opposite side blades (81) respectively inserted through the slots (46); wherein the side blades (81) of the limit frame (80) respectively form two pair of stubs (82) on opposite inner surfaces at opposite ends thereof, wherein the central plate of the limiting frame (80) defines a central hole (83) therein with a plurality of guide blocks (84) formed to correspond to the slide guides (21) of the cylinder (20).

* * * * *